(12) United States Patent
Idemura (10) Patent No.: US 6,385,399 B1
(45) Date of Patent: May 7, 2002

(54) OPTICAL APPARATUS AND SHOOTING SYSTEM INCLUDING ZOOM FUNCTION HAVING ELECTRICAL OPERATION MODE AND OTHER MODE

(75) Inventor: Takeshi Idemura, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 77 days.

(21) Appl. No.: 09/625,848

(22) Filed: Jul. 26, 2000

(30) Foreign Application Priority Data

Jul. 30, 1999 (JP) .......................................... 11-217983

(51) Int. Cl.[7] .......................... G03B 7/00; G03B 17/00; G02B 15/14
(52) U.S. Cl. .............................. 396/63; 396/65; 396/78; 396/72; 396/505; 348/347; 348/358; 348/362; 359/697; 359/739
(58) Field of Search ............................... 396/63–70, 72, 396/77–83, 85–87, 129, 131, 133–137, 257–262, 505–510; 348/345, 347, 357, 358, 362–366; 359/696–698, 739, 740

(56) References Cited

U.S. PATENT DOCUMENTS

| 5,526,188 A | * | 6/1996 | Kanno et al. ................ 359/698 |
| 5,592,250 A | * | 1/1997 | Shimizu ....................... 396/79 |
| 5,872,661 A | * | 2/1999 | Suzuki et al. ................ 359/698 |

* cited by examiner

Primary Examiner—W. B. Perkey
(74) Attorney, Agent, or Firm—Fitzpatrick, Cella, Harper & Scinto (57) ABSTRACT

An optical apparatus includes a first movable optical member, a second movable optical member, different from the first optical member, and a driving mechanism engaged with the second optical member, and operable in a first operation mode, in which the second optical member is movable by an electrical driving operation of the driving mechanism, and a second operation mode, in which the second optical member is movable by a manual driving operation. Operation of the driving mechanism is switched between the first operation mode and the second operation mode by control means such as a CPU, wherein, when the driving mechanism is operable in the second operation mode, the control means switches operation of the driving mechanism to the first operation mode in response to a driving operation of the first optical member. In one embodiment, the optical apparatus is a zoom lens apparatus, the first movable optical member is a focus lens unit, and the second movable optical member is a zoom element, where the control means switches operation of the driving mechanism from the second operation mode, in which the zoom element is movable by a manual driving operation to compensate for a variation in angle of view due to a driving operation of the focus lens unit, to the first operation mode, in which the zoom element is movable by an electrical driving operation. The driving mechanism may include a clutch for selectively transmitting a driving force between an electric drive source and the second optical member, where the control means switches the driving mechanism from the second operation mode to the first operation mode by switching the clutch from a disconnected state to a connected state.

35 Claims, 3 Drawing Sheets

FIG. 3

OPTICAL APPARATUS AND SHOOTING SYSTEM INCLUDING ZOOM FUNCTION HAVING ELECTRICAL OPERATION MODE AND OTHER MODE

BACKGROUND OF THE INVENTION

1. Field of the Invention

The present invention relates to an optical apparatus, such as a lens apparatus used for television shooting, and a shooting system including such an optical apparatus and an imaging apparatus.

2. Description of the Related Art

In a typical lens apparatus used for television shooting or the like, after a desired angle of view with respect to the subject has been set using a zoom optical element, a driving operation of the focus lens (focus lens unit) to perform a focussing operation, also varies the angle of view. Specifically, as the focus lens is driven so as to move the focus lens unit and shift the focus state toward the "infinity" side, the angle of view increases, and as the focus unit is driven so as to move the focus lens unit and shift the focus state toward the "close-up" side, the angle of view decreases.

In view of this, an angle-of-view correcting function recently has been proposed in which a zoom element is driven in an interlocked manner with the focus lens to restrain or compensate for variation in angle of view due to the focusing the operation of the focus lens.

In a lens apparatus provided with such an angle-of-view correcting function, the zoom element position and the focus lens position when the apparatus is at rest are read, the zoom element correction position needed for maintaining the current angle of view when the focus lens is driven to a new position is calculated, and the zoom element is driven so as to move to the calculated correction position.

The above-described angle-of-view correcting function is realized through accurate lens position control by an electric actuator, such as the zoom element motor. In view of this, in a lens apparatus provided with such an angle-of-view correcting function, it is a precondition that at least the zoom element should be driven electrically. Thus, a lens apparatus provided with such an angle-of-view correcting function has a construction that does not permit a zoom operation to be performed manually.

However, when the zoom element is driven for a purpose other than angle-of-view correction, for example, when an instantaneous angle of view correction is required, electric zooming cannot address this requirement. To comfortably obtain images under various shooting conditions, not only electric driving but also manual driving of the zoom element is required.

In view of this, it might be possible to provide the lens apparatus with a switch for switching between a state in which the zoom element can be electrically driven (hereinafter referred to as an "electric zooming mode") and a state in which the zoom element can be driven manually (hereinafter referred to as a "manual zoom mode"), where operation of the switch operates a clutch or the like so as to connect or disconnect a driving force transmission path between the motor and the zoom element.

However, such a structure requires operation of the switch in order to use the angle-of-view correcting function each time it is determined that an angle of view correction in the manual zooming mode is required, resulting in poor operability, and making it impossible to quickly meet shooting requirements.

SUMMARY OF THE INVENTION

The present invention has been made in view of the above problem in the prior art. Accordingly, it is an object of the present invention to provide an optical apparatus in which a movable portion, such as a zoom element, can be driven either electrically or manually, and in which it is possible to switch between an operation mode in which the movable portion is driven manually and an operation mode in which the movable portion is driven electrically, without the user having to perform any special mode switching operation.

In one aspect, the present invention relates to an optical apparatus comprising a first movable optical member, a second movable optical member, different from the first optical member, and operable in a first operation mode, in which the second optical member is movable by an electrical driving operation of the driving mechanism, and a second operation mode, in which the second optical member is movable by a manual driving operation, and control means for switching operation of the driving mechanism between the first operation mode and the second operation mode, wherein, when the driving mechanism is operable in the second operation mode, the control means switches operation of the driving mechanism to the first operation mode in response to a driving operation to the first optical member.

In one embodiment, the control means switches operation of the driving mechanism to the first operation mode in response to a command signal for a driving operation of the first optical member.

In another embodiment, the apparatus further comprises means for manually inputting a command signal for an electrical driving operation of the first optical member.

In another embodiment, the optical apparatus is attachable to a shooting device, and a command signal for a driving operation of the first optical member is input through the shooting device.

In another embodiment, the control means switches operation of the driving mechanism to the first operation mode in response to a start of a driving operation of the first optical member.

In another embodiment, the control means switches operation of the driving mechanism to the first operation mode at a start of an electrical driving operation of the second optical member started in response to a driving operation of the first optical member.

In another embodiment, the control means switches operation of the driving mechanism to the first operation mode in response to a drive control signal for performing electric drive control of the second optical member output in response to a driving operation of the first optical member.

In another embodiment, the driving mechanism comprises a clutch for selectively transmitting a driving force between an electric drive source and the second optical member, and the control means switches the driving mechanism from the second operation mode to the first operation mode by switching the clutch from a disconnected state to a connected state.

In another embodiment, the first optical member is a focus lens unit, the second optical member is a zoom element, and the control means switches operation of the driving mechanism from the second operation mode, in which the zoom element is movable by a manual driving operation to compensate for a variation in angle of view due to a driving operation of the focus lens unit, to the first operation mode, in which the zoom element is movable by an electrical driving operation.

In another embodiment, at least one of the first optical member and the second optical member comprises a diaphragm.

In another embodiment, the apparatus comprises selection means for selectively operating the control means in a first control mode, in which the control means switches operation of the driving mechanism from the second operation mode to the first operation mode in response to a driving operation of the first optical member, and a second control mode, in which the control means does not switch operation of the driving mechanism from the second operation mode to the first operation mode in response to a driving operation of the first optical member.

In another aspect, the present invention relates to an optical apparatus comprising a first movable optical member, a second movable optical member, different from the first optical member, a driving mechanism engaged with the second optical member, and operable in a first operation mode, in which the second optical member is movable by an electrical driving operation, and a second operation mode, in which the second optical member is movable by a manual driving operation, and control means for switching operation of the driving mechanism between the first operation mode and the second operation mode, wherein, when the driving mechanism is operable in the second operation mode, the control means switches operation of the driving mechanism to the first operation mode in response to a driving operation of the first optical member, and then switches operation of the driving mechanism to the second operation mode in accordance with the driving operation of the first optical member.

In one embodiment, when operation of the driving mechanism is switched to the first operation mode in response to a driving operation of the first optical member, the control means switches operation of the driving mechanism to the second operation mode upon completion of an electrical driving operation of the second optical member.

In another embodiment, when operation of the driving mechanism is switched to the first operation mode in response to a drive control signal for a driving operation of the first optical member, the control means switches operation of the driving mechanism to the second operation mode in response to completion of a drive control signal for an electrical driving operation of the second optical member.

In another embodiment, when operation of the driving mechanism is switched to the first operation mode in response to a driving operation of the driving mechanism to the second operation mode in response to a stopping of a movement of the second optical member in a driving operation of the second optical member.

In another embodiment, when the driving mechanism is operable in the first operation mode with a driving operation of the second optical member, the control means switches operation of the driving mechanism to the second operation mode in response to completion of a driving operation of the first optical member.

In another embodiment, when the driving mechanism is operable in the first operation mode in response to a drive command, the control means switches operation of the driving mechanism to the second operation mode in response to completion of a drive command for driving the first optical member.

In another embodiment, a drive command for a driving operation of the first optical member is input by manual operating means.

In another embodiment, a drive command for a driving operation of the first optical member is input through a shooting device attachable to the optical device.

In another embodiment, when the driving mechanism is operable in the first operation mode, the control means switches operation of the driving mechanism to the second operation mode in response to a stopping of a driving operation of the first optical member.

In another embodiment, the driving mechanism comprises a clutch for selectively transmitting a driving force between an electric drive source and the second optical member, and the control means switches operation from the first operation mode to the second operation mode by switching the clutch from a connected state to a disconnected state.

In another embodiment, the first optical member is a focus lens unit, and the second optical member is a zoom element, wherein the control means switches operation of the driving mechanism from a first operation state, in which the zoom element is movable by an electrical driving operation to compensate for variation in angle of view due to a driving operation of the focus lens unit, to a second operation state, in which the zoom element is movable by a manual driving operation.

In another aspect, the present invention relates to an optical apparatus comprising a first movable optical member, a second movable optical member, different from the first optical member,.and operable in a first operation mode, in which the second optical member is movable by an electrical driving operation, and a second operation mode, in which the second optical member is movable by a manual driving operation, and control means for switching operation of the driving mechanism between the first operation mode and the second operation mode, wherein, when the driving mechanism is operable in the second operation mode, the control means switches operation of the driving mechanism to the first operation mode in response to a driving operation of the first optical member, and switches operation of the driving mechanism to the second operation mode in response to a manual driving operation the second optical member.

In one embodiment, when the second optical member is moving in response to an electrical driving operation, the control means switches operation of the driving mechanism to the second operation mode in response to a manual driving operation of the second optical member.

In another embodiment, the apparatus further comprises means for detecting a load condition of an electric drive source for driving the second optical member, and the control means determines whether a manual driving operation of the second optical element is being performed based on a detection result of the detection means.

In another embodiment, the optical apparatus further comprises means for detecting a driving power of an electric drive source for driving the second optical member, and the control means determines whether a manual driving operation of the second optical member is being performed based on a detection result of the detecting means.

In another embodiment, the optical apparatus further comprises means for detecting a counter voltage generated in an electric drive source for the second optical member, and the control means determines whether a manual driving operation of the second optical member is being performed based on a detection result of the detecting means.

In another embodiment, the optical apparatus further comprises means for detecting a difference between a driving state corresponding to a drive command for driving the second optical member and an actual driving state of the second optical member, and the control means determines whether a manual driving operation of the second optical member is being performed based on a detection result of the detecting means.

In another embodiment, the driving mechanism comprises a clutch that selectively transmits a driving force between an electric drive source and the second optical member, and the control means switches the driving mechanism from the first operation mode to the second operation mode by switching the clutch from a connected state to a disconnected state.

In another embodiment, the first optical member is a focus lens unit, and the second optical member is a zoom element, wherein the control means switches operation of the driving mechanism from the first operation mode, in which the zoom element is movable by an electrical driving operation to compensate for variation in angle of view due to a driving operation of the focus lens unit, to the second operation mode, in which the zoom element is movable by a manual driving operation.

In yet another aspect, the present invention relates to a shooting system comprises a first movable optical member, a second movable optical member, different from the first optical member, photoelectric conversion means for converting light transmitted through an optical system including the first optical member and the second optical member into an electrical signal, a driving mechanism engaged with the second optical member, and operable in a first operation mode, in which the second optical member is movable by an electrical driving operation, and a second operation mode, in which the second optical member is movable by a manual driving operation, and control means for switching operation of the driving mechanism between the first operation mode and the second operation mode, wherein, when the driving mechanism is operable in the second operation mode, the control means switches the driving mechanism to the first operation mode in response to a driving operation of the first optical member.

DESCRIPTION OF THE PREFERRED EMBODIMENTS

Figure 1:
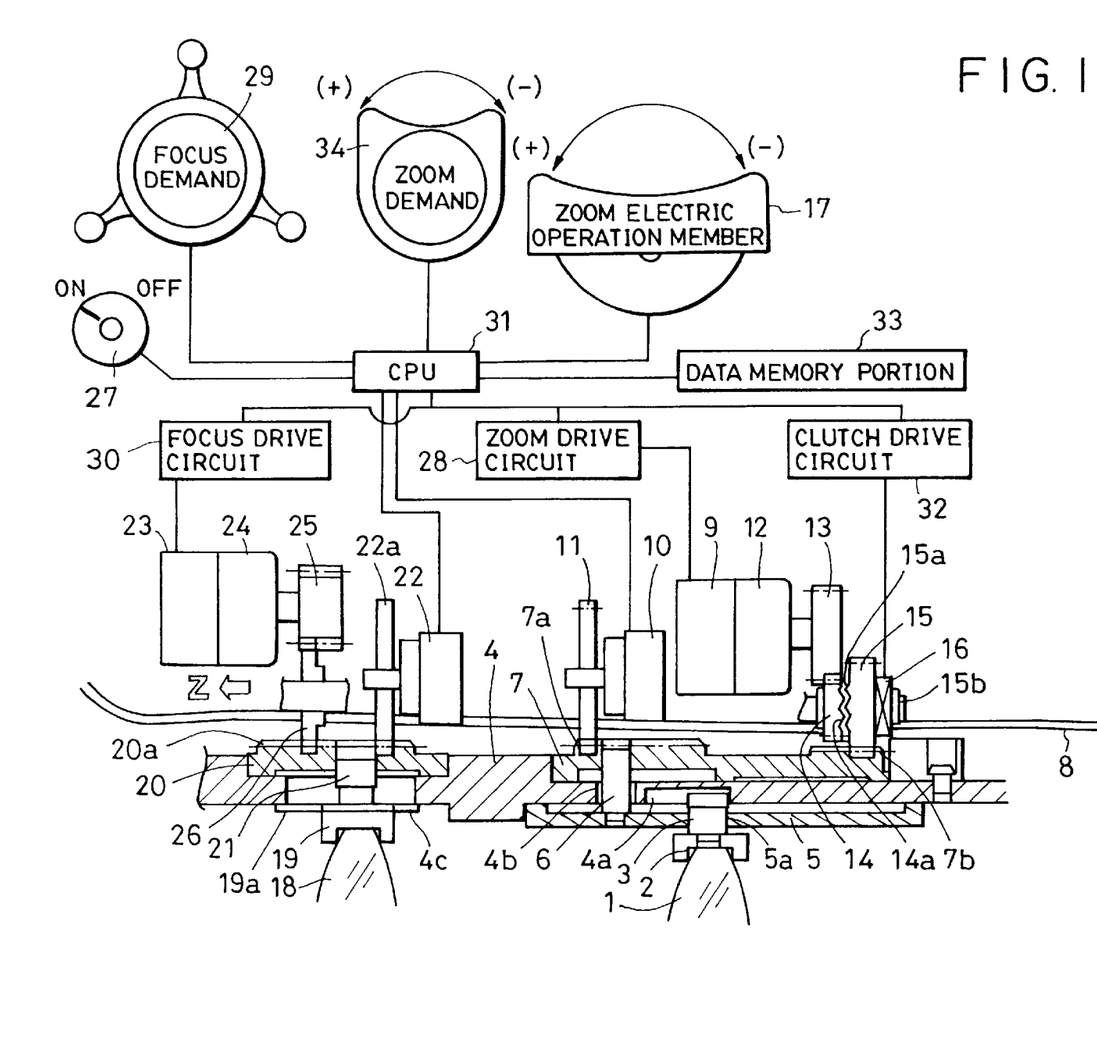
FIG. 1 schematically illustrates in cross-section an optical apparatus of the present invention, including a lens drive mechanism for a zoom lens apparatus.

FIG. 1 is a schematic cross sectional view of a portion of a zoom lens apparatus (optical apparatus) according to an embodiment of the present invention. This zoom lens apparatus may be used for television shooting or the like.

In FIG. 1, a zoom element (second optical member) 1 is supported by a zoom lens barrel 2 so as to be movable in a direction along the optical axis (the lateral direction in FIG. 1). The zoom lens barrel 2 is provided with at least three roller members 3 spaced about a circumferential perimeter of zoom lens barrel 2, e.g., periodically spaced at 120° intervals, and extending radially outward, where each roller member 3 is engaged with each of a linear groove 4a formed in a stationary cylinder (casing 4) and a curvalinear slit 5a formed in a rotary cylinder 5 (only 1 roller member 3 is illustrated in FIG. 1 for simplicity). In this manner, zoom lens barrel 2 is movably supported in the interior of rotary cylinder 5, and curvalinear groove 5a acts as a camming surface to move roller member 3 and zoom lens barrel 2 along a direction of the optical axis.

The rotary cylinder 5 is provided with a connection pin 6 extending radially outward through a slit 4b formed in the stationary cylinder 4, and engaged with a zoom operation ring 7. Thus, when the zoom operation ring 7 is rotated, the rotary cylinder 5 is rotated integrally with the zoom operation ring 7, and each roller member 3 provided in the zoom element barrel 2 moves along the linear slit 4a of the stationary cylinder 4 and the curvalinear slit 5a of the rotary cylinder 5. The operation ends of the zoom operation ring 7 and the zoom element 1 are determined by the operation range of the connection pin 6 rotating around the optical axis through the slit 4b of the stationary cylinder 4 (for example, the slit terminal ends or stops).

A drive unit 8 is arranged adjacent stationary cylinder 4. Drive unit 8 accommodates a CPU (main control means) 31, a zoom motor (electric drive source) 9, a potentiometer 10 for detecting the position of the zoom element, a focus motor 23, a potentiometer 22 for detecting the position of the focus lens, drive circuits 28, 30, 32, etc.

Mounted to the input shaft of the potentiometer 10 is a position detection gear 11 in mesh with an operation gear portion 7b provided on the zoom operation ring 7. Thus, when the zoom operation ring 7 rotates, an input rotation of the potentiometer 10 in accordance with its rotating amount is obtained, and it is possible to determine the position of the zoom element 1 from a detection signal from the potentiometer 10. Also, based on this position detection through the potentiometer 10, any impact force and impact sound generated when the zoom element 1 (zoom element barrel 2) hits its operation end (e.g., slit terminal end or stop) during electric driving of the zoom element 1 may be reduced by reducing the speed of the zoom element 1 in the vicinity of the operation end (slit terminal end or stop).

The driving force of the zoom motor 9 is transmitted to an intermediate gear 14 through a gear head 12 and a motor output gear 13. Formed at the end surface of the intermediate gear 14 is a face gear portion 14a, and a face gear portion 15a of a connection gear 15 is arranged opposing the face gear portion 14a. The connection gear 15 is provided in mesh with the operation gear portion 7b provided on the zoom operation ring 7. The zoom motor 9 is driven by a zoom drive circuit 28 which receives a position control signal from the CPU 31.

Further, an electromagnetic clutch 16 is mounted to the support shaft 15b of the connection gear 15 on a side of the connection gear 15 opposite the intermediate gear 14. Through ON/OFF control of this electromagnetic clutch 16, the connection gear 15 slides in the axial direction (longitudinal direction) of the support shaft 15b, and it is possible to switch between engagement and separation of the face gear portion 14a of the intermediate gear 14 and the face gear portion 15a of the connection gear 15.

The connection gear 15 is provided in mesh with the operation gear portion 7b of the operation ring 7, so that by ON-controlling the electromagnetic clutch 16, it is possible to cause the intermediate gear 14 and the connection gear 15 to integrally rotate, transmitting the driving force of the zoom motor 9 to the zoom operation ring 7, thereby rotating zoom operation ring 7, whereby the zoom element 1 (zoom element barrel 2) is electrically driven in a direction along the optical axis. In the description of this embodiment, the above-described state of the driving mechanism for electrically driving the zoom element 1 is referred to as the electric zoom mode.

By turning the electromagnetic clutch 16 "OFF", the intermediate gear 14 and the connection gear 15 are separated from each other, and the driving force of the zoom motor 9 is not transmitted to the zoom operation ring 7. When the zoom operation ring 7 is manually rotated, the load of the zoom motor 9 is not applied, and the zoom element 1 can be manually driven comfortably. In the description of this embodiment, the above-described state of the driving mechanism for manually driving the zoom element 1 is referred to as the manual zoom mode.

ON/OFF control of the electromagnetic clutch 16 is effected by a clutch drive circuit 32, which receives a signal from the CPU 31.

Further, the zoom element device of this embodiment has an angle-of-view correcting function by which the zoom element 1 is electrically driven in a direction along the optical axis to compensate for variation in angle of view due to the driving of the focus lens unit 18, described below, in a direction along the optical axis. This angle-of-view correcting function works effectively in the state in which the clutch drive circuit 32 receives a signal from the CPU 31, and turns the electromagnetic clutch 16 "ON", that is, by setting the apparatus in the electric zoom mode.

In the zoom lens apparatus of this embodiment, it is possible to electrically drive the zoom element 1 in cases other than working the angle-of-view correcting function. For example, in response to operation of the zoom electric operation member 17 provided on the outer surface of the drive unit 8 and the operation of a zoom demand 34 mounted on a tripod supporting the zoom lens apparatus and a camera (not shown) to which the zoom lens apparatus is attached, the electromagnetic clutch 16 is turned ON by the CPU 31 and the clutch drive circuit 32. Further, the speed of the zoom motor 9 may be variably controlled, in a known manner, in accordance with the operating amount of the zoom electric operation member 17 or the like, thereby controlling a speed of movement of the zoom element 1.

Further, the focus lens unit (first optical member) 18 is held by a focus lens barrel 19 and movable in a direction along the optical axis (the lateral direction in FIG. 1). In the outer peripheral surface of the focus lens barrel 19, a helicoid screw portion 19a is formed, which is engaged with a helicoid screw portion 4c of the stationary cylinder 4. Further, mounted to the stationary cylinder 4 is a focus operation ring 20 rotating around the optical axis, and the focus operation ring 20 and the focus lens barrel 19 are connected by a connection pin 21. Thus, when the focus operation ring 20 is rotated, it is possible to drive the focus lens unit 18 in a direction along the optical axis.

The output of the focus motor 23 is transmitted to an intermediate gear 26 through a gear head 24 and a focus motor output gear 25. The intermediate gear 26 is provided in mesh with a gear portion 20a formed on the focus operation ring 20. Thus, when the focus motor 23 is rotated, the rotation force is transmitted to the focus operation ring 20, thereby to rotate the focus operation ring 20, and it is possible to electrically drive the focus lens unit 18 (focus lens barrel 19) in a direction along the optical axis.

The focus motor 23 is driven by the focus drive circuit 30 in response to a position control signal generated from the CPU 31 based on focus control data (for example, data indicating the position of the focus lens unit 18, in the form of a signal indicating the driving of the focus lens through its variation) from a focus demand generating element (operating means) 29 mounted on the tripod.

Further, by moving the intermediate gear 26 in the direction of the arrow Z by a switching lever (not shown), it is possible to disengage the focus motor output gear 25 from the intermediate gear 26. When the apparatus is in this condition, the focus operation ring 20 is manually operable; that is, it is possible to manually drive the focus lens unit 18 comfortably, without a load of the focus motor 23 being applied thereto.

A potentiometer includes an input shaft on which a position detecting gear 22a is mounted. The position detecting gear 22a is provided in mesh with a gear 20a formed on the focus operation ring 20. Thus, when the focus operation ring 20 rotates, an input rotation of the potentiometer in accordance with the rotation amount is obtained, and, based on a detection signal from potentiometer 22, the position of the focus lens unit 18 can be determined. Further, based on this position detection and determination through the potentiometer 22, it is possible to mitigate any impact force and impact sound generated when the focus lens unit 18 (focus lens barrel 19) hits its operation end (e.g., slit terminal end or stop) during electric driving of the focus lens unit 18, so that it is possible to reduce the speed of the focus lens unit 18 in the vicinity of the operation end.

Next, an angle-of-view correcting operation in the zoom lens apparatus of FIG. 1 will be described with reference to the flowchart of FIG. 2. In this embodiment, it is possible to select either a mode in which the angle-of-view correcting function is performed (angle-of-view correction mode) or a mode in which the function is not performed (angle-of-view non-correction mode). Specifically, when an angle-of-view correction mode selecting switch 27 is turned on, the apparatus is set in the angle-of-view correction mode, and when the mode selecting switch 27 is turned off, the apparatus is set in the angle-of-view non-selection mode.

Figure 2:
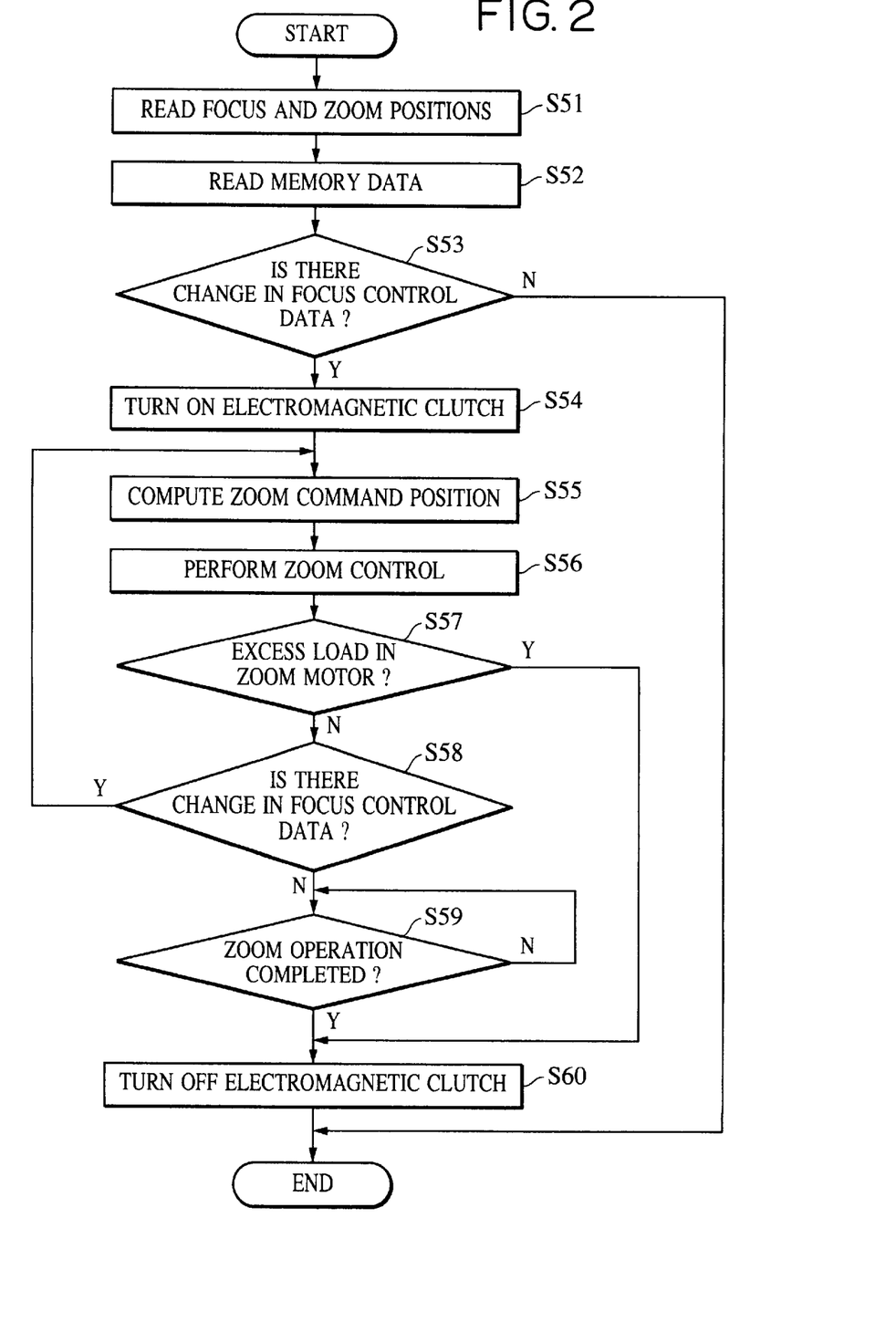
FIG. 2 is an operational flowchart of the optical apparatus of FIG. 1.

At the start of the flowchart of FIG. 2, the angle of view is determined by manually driving the zoom element 1 (manual zoom mode). First, in step S51, the position of the focus lens unit 18 (hereinafter referred to as the focus position) and the position of the zoom element 1 (hereinafter referred to as the zoom position) are read by the CPU 31 using potentiometers 22 and 10, respectively.

Next, in step S52, the CPU 31 reads from the data memory portion 33 correction data to be used to compute the zoom position for maintaining the angle of view with respect to changes in the focus position.

Next, in step S53, it is determined whether there has been a change in the focus control data from the focus demand 29. When there has been no change ("N"), the flow processing is ended. When there has been a change in the focus control data, the flow process advances to step S54, and the CPU 31 supplies a signal to the clutch drive circuit 32 to turn the electromagnetic clutch 16 ON, whereby the zoom lens apparatus is automatically switched from the manual zoom mode to the electric zoom mode.

In step S55, the CPU 31 first computes the position to which the focus lens unit 18 is to be moved (focus position command) from focus control data from the focus demand 29, and, on the basis of this focus position command and the correction data read from the data memory portion 33, the position to which the zoom element 1 is to be moved (zoom position command) is computed to maintain the angle of view (reference angle of view) before the focus control data changes.

In step S56, position control computation for the focus lens unit 18 is performed based on the focus position command computed in step S55 and the present focus position read in step S51, and the computation result is supplied to the focus control circuit 30, driving the focus lens unit 18. At the same time, position control computation for the zoom element 1 is performed based on the zoom position command computed in step S55 and the present zoom position read in step S51, and the computation result is supplied to the zoom control circuit 28, thereby driving the zoom element 1. In this manner, any variation in angle of view caused by the driving of the focus lens 1 is compensated for, and focusing is effected while maintaining a fixed angle of view.

In step S57, the current variation value (that is, the load condition of the zoom motor 9) is detected. When the current variation value exceeds a predetermined variation value within a predetermined time, the CPU 31 determines that the zoom operation ring 7 has been operated manually during the angle-of-view correction drive of the zoom element 1, and priority is given to this manual operation, that is, a signal is supplied to the clutch drive circuit 32, and the electromagnetic clutch 16 is turned OFF, whereby the zoom element device is automatically switched to the manual zoom mode. Further, driving of the zoom element 1 by the zoom motor 9 is stopped, thereby ending the flow procedure of FIG. 2. When the current variation value does not exceed the predetermined variation value within the predetermined time, the angle-of-view correction drive is continued, and the procedure advances to step S59.

In step S59, the CPU 31 determines whether there has been a change in the focus control data from the focus demand 29 during angle-of-view correction driving of the zoom element 1. When there has been a change in the focus control data, the flow processing returns to step S55, and a focus position command and a zoom position command corresponding to the new focus control data are computed, and driving of the focus lens unit 18 and angle-of-view correction driving of the zoom element 1 are performed.

When there has been no change in the focus control data during angle-of-data correction driving of the zoom element 1, the flow process advances to step S59, and the CPU 31 makes a determination as to whether the angle-of-view correction drive of the zoom element 1 has been completed. Specifically, when the zoom element 1 has not been moved within the predetermined time by differential computation of the detection value of the potentiometer 10, the zoom operation is regarded as completed, and the flow processing advances to step S60.

In step S60, the CPU 31 turns the electromagnetic clutch 16 OFF through operation of the clutch drive circuit 32, and the zoom element apparatus is switched from the electric zoom mode to the manual zoom mode, and the flow processing is ended.

In this manner, in this embodiment, when the apparatus is set in the angle-of-view correction mode and the manual zoom mode, when a change in the focus control data from the focus demand 29 is detected, CPU 31 automatically switches the zoom lens from the manual zoom mode to the electric zoom mode. Thus, in this embodiment, shooting can be started in a condition in which the apparatus quickly performs an angle-of-view correction function, without performing any special operation for switching from the manual zoom mode to the electric zoom mode during shooting in the manual zoom mode.

Further, in this embodiment, when angle-of-view correction driving of the zoom element 1 is complete, CPU 31 automatically switches from the electric zoom mode to the manual zoom mode. Thus, in this embodiment, it is possible to quickly effect frame change through manual operation of the zoom element 1, without performing any special operation for switching from the electric zoom mode to the manual zoom mode after performing focusing while maintaining a fixed angle of view.

Further, in this embodiment, when zoom operation ring 7 is manually operated during an angle-of-view correction driving of the zoom element 1, CPU 31 automatically switches from the electric zoom mode to the manual zoom mode. Thus, in this embodiment, it is possible to interrupt an angle-of-view correction drive of the zoom element 1 and perform a manual drive operation, without performing any special operation for switching from the electric zoom mode to the manual zoom mode. Further, it is possible to prevent a large load from being applied to the zoom motor 9.

In this embodiment, the electromagnetic clutch 16 is not turned ON in response to a focus operation. However, the electromagnetic clutch 16 is turned ON in response to operation of zoom electric operation member 17 and zoom demand 34 in the manual zoom mode, and CPU 31 switches from the manual zoom mode to the electric zoom mode without requiring the user to perform any special mode switching operation.

Further, while operating in the above-described embodiment, mode is switched from the manual zoom mode to the electric zoom mode by inputting focus control data to the CPU 31 from the focus demand 29, it is also possible for focus control data to be input through communication from a camera to which the zoom lens apparatus is attached. It is also possible to input focus control data from a control unit arranged in an adjusting room or other location situated remote from the shooting system.

Further, while in the above-described embodiment, the operation mode is switched from the manual zoom mode to the electric zoom mode based on a detection in step S53 that the focus control data has been changed, that is, before the actual driving (moving) of focus lens unit 18 is started, it is also possible to adopt an arrangement in which mode is switched from the manual zoom mode to the electric zoom mode based on a determination that driving (movement) of the focus lens unit 18 has started. By adopting this arrangement, it is possible to cause the zoom element 1 to perform an angle-of-view drive even when the focus lens unit 18 is operated manually. Further, for example, even in a case in which focus operation ring 20 is pressed by a hand or the like, and in which focus control data or a focus position command signal from a focus demand element 29 or the like differs from the actual focus position, an angle-of-view correction driving of zoom element 1 may be performed in accordance with the actual focus position. In this manner, it is possible to prevent the angle of view from varying during an angle-of-view correction drive based on a focus position command signal.

A driving start (movement) of the focus lens unit 18 can be detected/determined through differential computation of a position detection result within a predetermined time of the potentiometer detecting focus movement. Further, it is also possible to adopt an arrangement in which the operation mode is switched from the manual zoom mode to the electric zoom mode in synchronism with a timing in which the CPU 31 supplies a position control signal to the zoom drive circuit 28 to effect an angle of view correction operation.

Further, it is also possible to adopt an arrangement in which the operation mode is switched from the manual zoom mode to the electric zoom mode by detecting that a position control signal (drive control signal) of the zoom element 1 computed based on focus control data is output from the CPU 31 to the zoom drive circuit 28.

Further, while in the above-described embodiment the operation mode is switched from the electric zoom mode to the manual zoom mode after a stopping of the zoom element 1 driven for angle of view correction is detected, it is also possible to adopt an arrangement in which the operation mode is switched from the electric zoom mode to the manual zoom mode after a detection that the transmission of the position control signal for the zoom element 1 from the CPU 31 to the zoom drive circuit 28 is completed. Further, it is also possible to switch operation modes after a detection that a change in focus control data from the focus demand 29 or the like is completed, or to switch operation modes after a detection that the driving of the focus lens unit 18 is completed.

Further, while in the above-described embodiment the zoom operation ring 7 is manually operated during an angle-of-view correction drive of the zoom element 1 so as to vary a driving current (or driving power) for the zoom motor 9, thereby to detect a manual operation, it is also possible to detect the manual operation based on a change in the counter voltage generated in the zoom motor 9 or the difference between the zoom position command and the actual zoom position obtained by the potentiometer 10.

Further, while in the above-described embodiment the operation mode is switched between the manual zoom mode and the electric zoom mode by using an electromagnetic clutch 16, it is also possible to use some other means, such as a solenoid, which can electrically connect and disconnect a driving force transmission path.

Further, while in the above-described embodiment the operation mode is switched automatically from the manual zoom mode to the electric zoom mode upon driving of the focus lens unit 18, making it possible to perform angle-of-view correction driving of the zoom element 1, it is also possible in this embodiment, for example, to adopt an arrangement in which the operation mode is switched from the manual focus mode to the automatic focus mode upon driving of the zoom element.

In the present invention, the first and second optical members may be any optical members constituting the optical system, such as the focus lens unit, zoom element, iris (diaphragm), macro lens, and filter disc.

Figure 3:
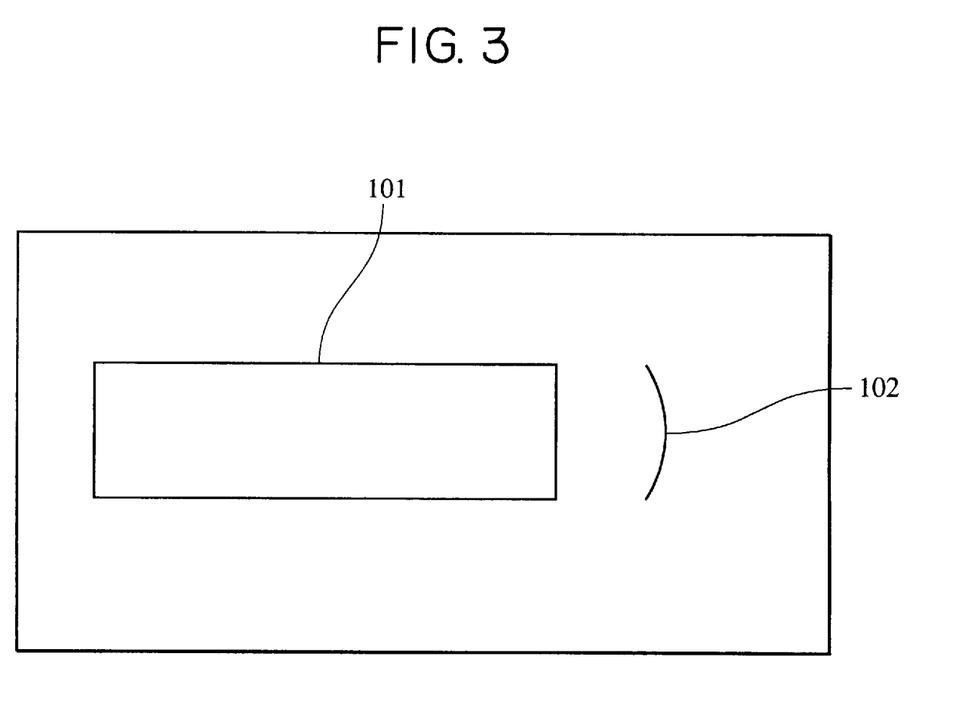
FIG. 3 shows a shooting system having the optical apparatus of the present invention.

In the optical apparatus of the present invention, described above in detail, it is possible, for example, to mount the optical apparatus 101 of the present invention in an imaging apparatus equipped with a photoelectric conversion means 102 or the like, as shown in FIG. 3, thereby providing a highly accurate shooting system.

As described above, in first and fourth aspects of the present invention, when electric drive control of the second optical member is to be performed in response to a driving operation of the first optical member while shooting, by performing manual driving of the second optical member, operation of the driving mechanism can be automatically switched to a state in which the second optical member is electrically driven, so that there is no need for the user to perform any special operation to switch the state of the driving mechanism, and it is possible to quickly start a driving operation of the second optical member upon driving of the first optical member (for example, an electric driving of the zoom element for angle-of-view correction with driving of the focus lens unit).

In accordance with a second aspect of the present invention, when the driving mechanism is set in a state in which the second optical member is electrically driven, the driving mechanism is automatically switched to a state in which the second optical member is manually driven when driving of the second optical member upon driving of the first optical member is ended, whereby it is possible to quickly start manual driving of the second optical member (for example, quick change in angle of view through manual driving of the zoom element) without the user having to perform any special operation for switching the state of the driving mechanism.

Further, in accordance with a third aspect of the present invention, when the driving mechanism is set in a state in which the second optical member may be electrically driven or when the second optical member is being electrically driven, the apparatus may be switched to a state in which the second optical member is driven manually in response to the input of a manual driving force on the second optical member, whereby when shooting through manual driving of the second optical member is required while shooting or the like is being performed (for example, angle-of-view correction of the zoom element is being performed) through electric driving of the second optical member, there is no need for the user to perform any special operation for switching the state of the driving mechanism, and it is possible to quickly start a manual operation of the second optical member. Further, it is possible to prevent an excessive load from being applied to the electric drive source.

In accordance with the present invention, as described above, it is possible to realize an optical apparatus and a shooting system readily adaptable to changes in shooting conditions and which are easy to use.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An optical apparatus comprising:
   a first movable optical member;
   a second movable optical member, different from the first optical member;
   a driving mechanism engaged with said second optical member, and operable in a first operation mode, in which said second optical member is movable by an electrical driving operation of said driving mechanism, and a second operation mode, in which said second optical member is movable by a manual driving operation; and
   control means for switching operation of said driving mechanism between the first operation mode and the second operation mode,
   wherein, when said driving mechanism is operable in the second operation mode, said control means switches operation of said driving mechanism to the first operation mode in response to a driving operation of said first optical member.

2. An optical apparatus according to claim 1, wherein, when said driving mechanism is operable in the second operation mode, said control means switches operation of said driving mechanism to the first operation mode in response to a command signal for a driving operation of said first optical member.

3. An optical apparatus according to claim 2, further comprising means for manually inputting a command signal for an electrical driving operation of said first optical member.

4. An optical apparatus according to claim 2, wherein said optical apparatus is attachable to a shooting device, and a command signal for a driving operation of said first optical member is input through the shooting device.

5. An optical apparatus according to claim 1, wherein, when said driving mechanism is operable in the second operation mode, said control means switches operation of said driving mechanism to the first operation mode in response to a start of a driving operation of said first optical member.

6. An optical apparatus according to claim 1, wherein, when said driving mechanism is operable in the second operation mode, said control means switches operation of said driving mechanism to the first operation mode at a start of an electric driving operation of said second optical member started in response to a driving operation of said first optical member.

7. An optical apparatus according to claim 1, wherein, when said driving mechanism is operable in the second operation mode, said control means switches operation of said driving mechanism to the first operation mode in response to a drive control signal for performing electric drive control of said second optical member output in response to a driving operation of said first optical member.

8. An optical apparatus according to claim 1, wherein said driving mechanism comprises clutch means for selectively transmitting a driving force between an electric drive source and said second optical member, and said control means switches said driving mechanism from the second operation mode to the first operation mode by switching said clutch means from a disconnected state to a connected state.

9. An optical apparatus according to claim 1, wherein said first optical member is a focus lens unit, and said second optical member is a zoom element, and wherein said control means switches operation of said driving mechanism from the second operation mode, in which said zoom element is movable by a manual driving operation to compensate for a variation in angle of view due to a driving operation of said focus lens unit, to the first operation mode, in which said zoom element is movable by an electrical driving operation.

10. An optical apparatus according to claim 1, wherein at least one of said first optical member and said second optical member comprises a diaphragm.

11. An optical apparatus according to claim 1, further comprising:
   selection means for selectively operating said control means in a first control mode, in which said control means switches operation of said driving mechanism from the second operation mode to the first operation mode in response to a driving operation of said first optical member, and a second control mode, in which said control means does not switch operation of driving mechanism from the second operation mode to the first operation mode in response to a driving operation of first optical member.

12. An optical apparatus comprising:
   a first movable optical member;
   a second movable optical member, different from said first optical member;
   a driving mechanism engaged with said second optical member, and operable in a first operation mode, in which said second optical member is movable by an electrical driving operation, and a second operation mode, in which said second optical member is movable by a manual driving operation, and
   control means for switching operation of said driving mechanism between the first operation mode and the second operation mode,
   wherein, when said driving mechanism is operable in the second operation mode, said control means switches operation of said driving mechanism to the first operation mode in response to a driving operation of said first optical member, and then switches operation of the driving mechanism to the second operation mode in accordance with the driving operation of said first optical member.

13. An optical apparatus according to claim 12, wherein, when operation of said driving mechanism is switched to the first operation mode in response to a driving operation of said first optical member, said control means switches operation of said driving mechanism to the second operation mode upon completion of an electrical driving operation of said second optical member.

14. An optical apparatus according to claim 13, wherein when operation of said driving mechanism is switched to the first operation mode in response to a drive control signal for a driving operation of said first optical member, said control means switches operation of said driving mechanism to the second operation mode in response to completion of a drive control signal for an electrical driving operation of said second optical member.

15. An optical apparatus according to claim 13, wherein, when operation of said driving mechanism is switched to the first operation mode in response to a driving operation of said first optical member, said control means switches operation of said driving mechanism to the second operation mode in response to a stopping of a movement of said second optical member in a driving operation of said second optical member.

16. An optical apparatus according to claim 12, wherein, when said driving mechanism is operable in the first operation mode during a driving operation of said second optical member, said control means switches operation of said driving mechanism to the second operation mode in response to completion of the driving operation of said first optical member.

17. An optical apparatus according to claim 16, wherein, when said driving mechanism is operable in the first operation mode in response to a drive command for driving means switches operation of said driving mechanism to the second operation mode in response to completion of a drive command for driving said first optical member.

18. An optical apparatus according to claim 17, wherein a drive command for a driving operation of said first optical member is input by manual operating means.

19. An optical apparatus according to claim 17, wherein a drive command for a driving operation of said first optical member is input through a shooting device attachable to the optical device.

20. An optical apparatus according to claim 16, wherein, when said driving mechanism is operable in the first operation mode, said control means switches operation of said driving mechanism to the second operation mode in response to a stopping of a driving operation of said first optical member.

21. An optical apparatus according to claim 12, wherein said driving mechanism comprises clutch means for selectively transmitting a driving force between an electric drive source and said second optical member, and said control means switches operation from the first operation mode to the second operation mode by switching the clutch means from a connected state to a disconnected state.

22. An optical apparatus according to claim 12, wherein said first optical member is a focus lens unit, and said second optical member is a zoom element, and wherein said control means switches operation of said driving mechanism from a first operation state, in which the zoom element is movable by an electrical driving operation to compensate for variation in angle of view due to a driving operation of the focus lens unit, to a second operation state, in which said zoom element is movable by a manual driving operation.

23. An optical apparatus comprising:
    a first movable optical member;
    a second movable optical member, different from the first optical member;
    a driving mechanism engaged with said second optical member, and operable in a first operation mode, in which said second optical member is movable by an electrical driving operation, and a second operation mode, in which said second optical member is movable by a manual driving operation; and
    control means for switching operation of said driving mechanism between the first operation mode and the second operation mode,
    wherein, when said driving mechanism is operable in the second operation mode, said control means switches operation of said driving mechanism to the first operation mode in response to a driving operation of said first optical member, and switches operation of said driving mechanism to the second operation mode in response to a manual driving operation said second optical member.

24. An optical apparatus according to claim 23, wherein, when said second optical member is moving in response to an electrical driving operation, said control means switches operation of said driving mechanism to the second operation mode in response to a manual driving operation of said second optical member.

25. An optical apparatus according to claim 23, wherein said control means detects a load condition of an electric drive source for driving said second optical member, and determines whether a manual driving operation of said second optical element is being performed based on a detection result of said control means.

26. An optical apparatus according to claim 23, further comprising:
    means for detecting a driving power of an electric drive source for driving said second optical member, and
    wherein said control means determines whether a manual driving operation of said second optical member is being performed based on a detection result of said detecting means.

27. An optical apparatus according to claim 23, further comprising:
    means for detecting a counter voltage generated in an electric drive source for said second optical member, and
    wherein said control means determines whether a manual driving operation of said second optical member is being performed based on a detection result of said detecting means.

28. An optical apparatus according to claim 23, further comprising:
    means for detecting a difference between a driving state corresponding to a drive command for driving said second optical member and an actual driving state of said second optical member, and
    wherein said control means determines whether a manual driving operation of said second optical member is being performed based on a detection result of said detecting means.

29. An optical apparatus according to claim 23, wherein said driving mechanism comprises clutch means selectively transmitting a driving force between an electric drive source and said second optical member, and said control means switches said driving mechanism from the first operation mode to the second operation mode by switching said clutch means from a connected state to a disconnected state.

30. An optical apparatus according to claim 23, wherein said first optical member is a focus lens unit, and said second optical member is a zoom element, and wherein said control means switches operation of said driving mechanism from the first operation mode, in which said zoom element is movable by an electrical driving operation to compensate for variation in angle of view due to a driving operation of said focus lens unit, to the second operation mode, in which said zoom element is movable by a manual driving operation.

31. A shooting system comprising:
    a first movable optical member;
    a second movable optical member, different from said first optical member;
    photoelectric conversion means for converting light transmitted through an optical system including said first optical member and said second optical member into an electrical signal;
    a driving mechanism engaged with said second optical member, and operable in a first operation mode, in which said optical member is movable by an electrical driving operation, and a second operation mode, in which said second optical member is movable by a manual driving operation; and
    control means for switching operation of said driving mechanism between the first operation mode and the second operation mode,
    wherein, when said driving mechanism is operable in the second operation mode, said control means switches said driving mechanism to the first operation mode in response to a driving operation of said first optical member.

32. An optical apparatus comprising:
    a first optical member constituting an optical device;
    a second optical member different from the first optical member and constituting the optical device;
    an operation ring rotatable around the optical axis of the second optical member and adapted to drive the second optical member;
    a switching mechanism which transmits drive force from an electrical drive source to the operation ring and which can be switched between a state in which the second optical member is electrically driven and a state in which electrical drive of the second optical member is canceled; and
    control means for switching the switching mechanism between the state in which the second optical member is electrically driven and the state in which electrical drive of the second optical member is canceled,
    wherein, when the switching mechanism is set in the state in which electrical drive of the second optical member is canceled, the control means switches the switching mechanism to the state in which the second optical member is electrically driven when the first optical member is to be driven.

33. An optical apparatus comprising:
    a first optical member constituting an optical device;
    a second optical member different from the first optical member and constituting the optical device;

an operation ring rotatable around the optical axis of the second optical member and adapted to drive the second optical member;

a switching mechanism which transmits drive force from an electrical drive source to the operation ring and which can be switched between a state in which the second optical member is electrically driven and a state in which electrical drive of the second optical member is canceled; and control means for switching the switching mechanism between the state in which the second optical member is electrically driven and the state in which electrical drive of the second optical member is canceled, wherein, when the switching mechanism is set in the state in which electrical drive of the second optical member is canceled, the control means switches, when the first optical member is to be driven, the switching mechanism to the state in which the second optical member is electrically driven, and, in accordance with the drive of the first optical member, switches the switching mechanism to the state in which electrical drive of the second optical member is canceled.

34. An optical apparatus comprising:

a first optical member constituting an optical device;

a second optical member different from the first optical member and constituting the optical device;

an operation ring rotatable around the optical axis of the second optical member and adapted to drive the second optical member;

a switching mechanism which transmits drive force from an electrical drive source to the operation ring and which can be switched between a state in which the second optical member is electrically driven and a state in which electrical drive of the second optical member is canceled; and control means for switching the switching mechanism between the state in which the second optical member is electrically driven and the state in which electrical drive of the second optical member is canceled, wherein, when the switching mechanism is set in the state in which electrical drive of the second optical member is canceled, the control means switches, when the first optical member is to be driven, the switching mechanism to the state in which the second optical member is electrically driven, and, based on a fact that operation for manually driving the second optical member has been conducted, switches the switching mechanism to the state in which electrical drive of the second optical member is canceled.

35. A shooting system comprising:

a first optical member constituting an optical device;

a second optical member different from the first optical member and constituting the optical device;

an operation ring rotatable around the optical axis of the second optical member and adapted to drive the second optical member;

a switching mechanism which transmits drive force from an electrical drive source to the operation ring and which can be switched between a state in which the second optical member is electrically driven and a state in which electrical drive of the second optical member is canceled; and control means for switching the switching mechanism between the state in which the second optical member is electrically driven and the state in which electrical drive of the second optical member is canceled, wherein, when the switching mechanism is set in the state in which electrical drive of the second optical member is canceled, the control means switches the switching mechanism to the state in which the second optical member is electrically driven when the first optical member is to be driven.

* * * * *

UNITED STATES PATENT AND TRADEMARK OFFICE
CERTIFICATE OF CORRECTION

PATENT NO.    : 6,385,399 B1
DATED         : May 7, 2002
INVENTOR(S)   : Takeshi Idemura It is certified that error appears in the above-identified patent and that said Letters Patent is hereby corrected as shown below:

Column 4,
Line 24, "member,.and" should read -- member, and --.

Column 5,
Line 19, "comprises" should read -- comprising --.
Line 61, "curvalinear" should read -- curvilinear --.
Line 65, "curvalinear" should read -- curvilinear --.

Column 6,
Line 8, "curvalinear" should read -- curvilinear --.

Column 8,
Line 6, "potentiometer" should read -- potentiometer 22 --.

Column 10,
Line 20, "operating" should be deleted.
Line 21, "mode is" should read -- the operating mode is --.

Column 13,
Line 53, "first" should read -- said first --.

Column 14,
Line 41, "driving means" should read -- driving said first optical means, said control means --.

UNITED STATES PATENT AND TRADEMARK OFFICE
CERTIFICATE OF CORRECTION

PATENT NO. : 6,385,399 B1
DATED : May 7, 2002
INVENTOR(S) : Takeshi Idemura

It is certified that error appears in the above-identified patent and that said Letters Patent is hereby corrected as shown below:

Column 15,
Line 26, "said" should read -- of said --.

Signed and Sealed this

Fifth Day of November, 2002

*Attest:*

*Attesting Officer*

JAMES E. ROGAN
*Director of the United States Patent and Trademark Office*